(12) United States Patent
Inoue

(10) Patent No.: US 6,765,605 B1
(45) Date of Patent: Jul. 20, 2004

(54) SPLIT SCANNING OPTICAL APPARATUS

(75) Inventor: Kousuke Inoue, Iwatsuki (JP)

(73) Assignee: Fuji Xerox Co., Ltd., Tokyo (JP)

(*) Notice: Subject to any disclaimer, the term of this patent is extended or adjusted under 35 U.S.C. 154(b) by 0 days.

(21) Appl. No.: 09/455,457

(22) Filed: Dec. 6, 1999

(30) Foreign Application Priority Data

Dec. 17, 1998 (JP) .......................................... 10-359677

(51) Int. Cl.⁷ ................................................ B41J 2/435
(52) U.S. Cl. ........................................ 347/234; 347/248
(58) Field of Search ............................. 347/116, 233, 347/234, 235, 248, 250; 345/541, 686; 711/2, 147, 148; 358/483; 359/204; 382/284, 305

(56) References Cited

U.S. PATENT DOCUMENTS

| 4,092,632 A | * | 5/1978 | Agulnek ..................... 382/284 |
| 4,449,151 A | * | 5/1984 | Yokota et al. .............. 358/483 |
| 5,107,280 A | * | 4/1992 | Ohashi et al. .............. 347/235 |
| 5,930,019 A | * | 7/1999 | Suzuki et al. .............. 359/204 |

FOREIGN PATENT DOCUMENTS

| JP | 54-128352 | 10/1979 |
| JP | 6-255169 | 9/1994 |

* cited by examiner

Primary Examiner—Hai Pham
(74) Attorney, Agent, or Firm—Oliff & Berridge, PLC

(57) ABSTRACT

Correction of a positional deviation of split scanning lines in a sub scanning direction and modification of an image information split position are performed with a simple circuit configuration. When addresses of storage units in which split image information pieces A and B are stored are determined by address specification units, a overlap area is allocated in advance so that a split position is set based on image information split position information. As a result, dummy signals corresponding to off signals for a light source are stored in a storage unit other than storage units in which image information is stored. The dummy signals exert no influence on counterparts in the overlap area, and it is unnecessary to change a write address each time a split position is modified.

4 Claims, 10 Drawing Sheets

SPLIT SCANNING OPTICAL APPARATUS

BACKGROUND OF THE INVENTION

1. Field of the Invention

The present invention relates to a scanning optical apparatus used in image recording apparatuses such as a laser printer, a digital copier, and the like that record an image on a photosensitive material by exposing the photosensitive material to a scanning laser beam in accordance with image information, and more particularly to a split scanning optical apparatus that splits and scans a surface to be scanned by plural light beams.

2. Description of the Prior Art

With advance in network technologies and advent of sophisticated computers, there has recently been a demand for image output of high speed and high resolution in image recording apparatuses such as a laser printer, a digital copier, and other output apparatuses. To achieve the requirements for high speed and high resolution, a technology not involving an increase in the number of rotations of a polygon mirror is proposed in Japanese Published Unexamined Patent Application Nos. Sho 54-128352 (hereinafter referred to as prior art 1) and Hei 6-255169 (hereinafter referred to as prior art 2). This technology relates to a split scanning optical apparatus that increases a substantial scanning speed without increasing the number of rotations of a polygon mirror by using plural light sources and forming one main scanning line with plural split scanning lines.

The above described split scanning optical apparatus has difficulty in accurately adjusting the position between split scanning lines to a desired position, and in order to obtain satisfactory output images, it must compensate for the timing of starting to output image information in accordance with the position between split scanning lines.

Output timing compensation is achieved, for a main scanning direction, by increasing or decreasing a delay amount from a horizontal synchronizing signal to the start of image information output, and for a sub scanning direction, by changing an image information output start timing in units of horizontal synchronizing signals in accordance with a positional deviation amount between split scanning lines in the sub scanning direction.

FIG. 10 shows a time chart on a deviation amount between split scanning lines in the sub scanning direction and the timing of image information output start.

As shown in FIG. 10, there is a positional deviation amount of three lines between split scanning lines A and B in the sub scanning direction. Accordingly, split image information A must be written a three-line period later than split image information B to match the position of image information on a photosensitive material in the sub scanning direction.

In the above described prior arts 1 and 2, mention is made of position compensation in the main scanning direction, but a positional deviation in the sub scanning direction is not taken into account.

Furthermore, in the split scanning optical apparatus, if there remained a small positional deviation of split scanning lines that cannot be compensated, images corresponding to joints of images formed by the split scanning lines would be disturbed. To prevent image quality from decreasing due to the disturbance, coincidence of image joint positions in the main scanning direction must be prevented by changing split image timing for every main scanning or joining split images in a position of image information corresponding to a light source off signal.

If such processing were performed by the split scanning optical apparatus in which a deviation of split scanning line position exists in the sub scanning direction, as shown in FIG. 10, pieces of image information to be written onto a photosensitive material during one-time main scanning would be written in different positions in the sub scanning direction by the split scanning lines. As a result, the split positions of the pieces of image information would be different.

Therefore, there exists a problem in that, to read out split image information, split position information must be delayed for a positional deviation of split scanning lines in the sub scanning direction, complicating circuit configuration.

SUMMARY OF THE INVENTION

The present invention provides a split scanning optical apparatus that can perform correction of a positional deviation of split scanning lines in the sub scanning direction and modification of image information split positions with a simple circuit configuration.

The split scanning optical apparatus according to the present invention has plural split scanning units for performing scanning within split areas split in a main scanning area and performs exposure for one-time main scanning by performing scanning at the same time by the plural split scanning units. The split scanning optical apparatus also has an image information split part that is provided with overlap areas in scanning areas of the split scanning units, an identical portion on a surface to be scanned being exposable mutually in the overlap areas, and splits image information to be provided by exposure to a surface to be scanned into split image information to be provided respectively by the split scanning units. The apparatus further has plural storage parts that respectively store the split image information, plural address specification units that respectively specify storage addresses to the storage parts, and a store operation control unit that controls a store operation of the storage parts so that a split position of the image information falls in an overlapping range of plural storage parts specified by the address specification parts.

According to this apparatus, the address specification part can specify storage addresses to the storage parts so that mutually adjacent pieces of split image information can be stored in an overlapped form, whereby image information is split within a range of addresses of the overlap area by the store operation control part. Therefore, a split position can be freely selected.

The apparatus may further have a timing change part that changes split timing by the store operation control part for every main scanning operation or for every certain plural number of main scanning operations.

According to this apparatus, with a finished image in mind, the finished image would be made finer by obliquely or randomly connecting split positions of main scanning than straightly from top to bottom connecting them. Accordingly, the quality of a finished image can be improved by changing the switching timing of the store operation switching part for every main scanning operation or for every certain plural number of main scanning operations.

In the split scanning optical apparatus, the store operation control part may function as an image information disabling part that outputs a dummy signal as a light source off signal to addresses within the range of the overlap area specified by the address specification parts in storage parts other than storage parts that store image information.

According to this apparatus, in storage parts other than storage parts that store image information, dummy signals are stored in addresses within the range of an overlap area. Accordingly, a split position in the column direction, that is, the main scanning direction can be freely changed by inserting the dummy signals, and furthermore, a split position can be changed on a one-line basis based on the number of dummy signals.

In view of control, a split is considered to always have taken place at an identical position. Therefore, a deviation in the row direction, that is, the sub scanning direction need not be subjected to feedback control, so that only a deviation amount may be compensated.

In the split scanning optical apparatus, if image information corresponding to the dummy signal is detected before the information split takes place, an image split store operation by the image information disabling part may be performed upon detecting the image information corresponding to the dummy signal.

According to this apparatus, when a split position is selected, if there exists information for which a light source does not go on, that is, image information for which the output of a laser beam goes off when an image is formed by the laser beam, selection of the position as a split position helps to minimize reduction in image quality by split scanning.

In the split scanning optical apparatus, the store operation control part may function as a store operation switching part that, when both two address specification parts are busy, cancels a store operation on split image information A to a storage part thereof and switches to a store operation on split image information B to a storage part thereof, wherein the two pieces A and B of split image information each contain identical image information in the overlap area and one of the address specification parts controls a store operation on the split image information A to the storage part thereof and the other controls a store operation on the split image information B to the storage part thereof.

According to this apparatus, identical information in the overlap area can be stored in both the split image information A and the split image information B. If there are two or more split positions, two mutually adjacent pieces of split image information may be considered individually.

At least, for image information in the overlap area, the operation of the respective address specification parts to control a store operation to the respective storage parts of the split image information pieces A and B is started and the two storage parts are allocated areas capable of storing the image information of the overlap area.

Accordingly, if both two address specification parts are busy, at any time, a store operation on the split image information A to the storage part can be canceled to switch to a store operation on the split image information B to the storage part.

In the store operation switching part, no time priority is Bet between the function to cancel a store operation on the split image information A to the storage part and the function to switch to a store operation on the split image information B to the storage part.

BRIEF DESCRIPTION OF THE DRAWINGS

Preferred embodiments of a split scanning optical apparatus according to the present invention will be described in detail based on the drawings.

DESCRIPTION OF THE PREFERRED EMBODIMENTS

First Embodiment

Figure 1:
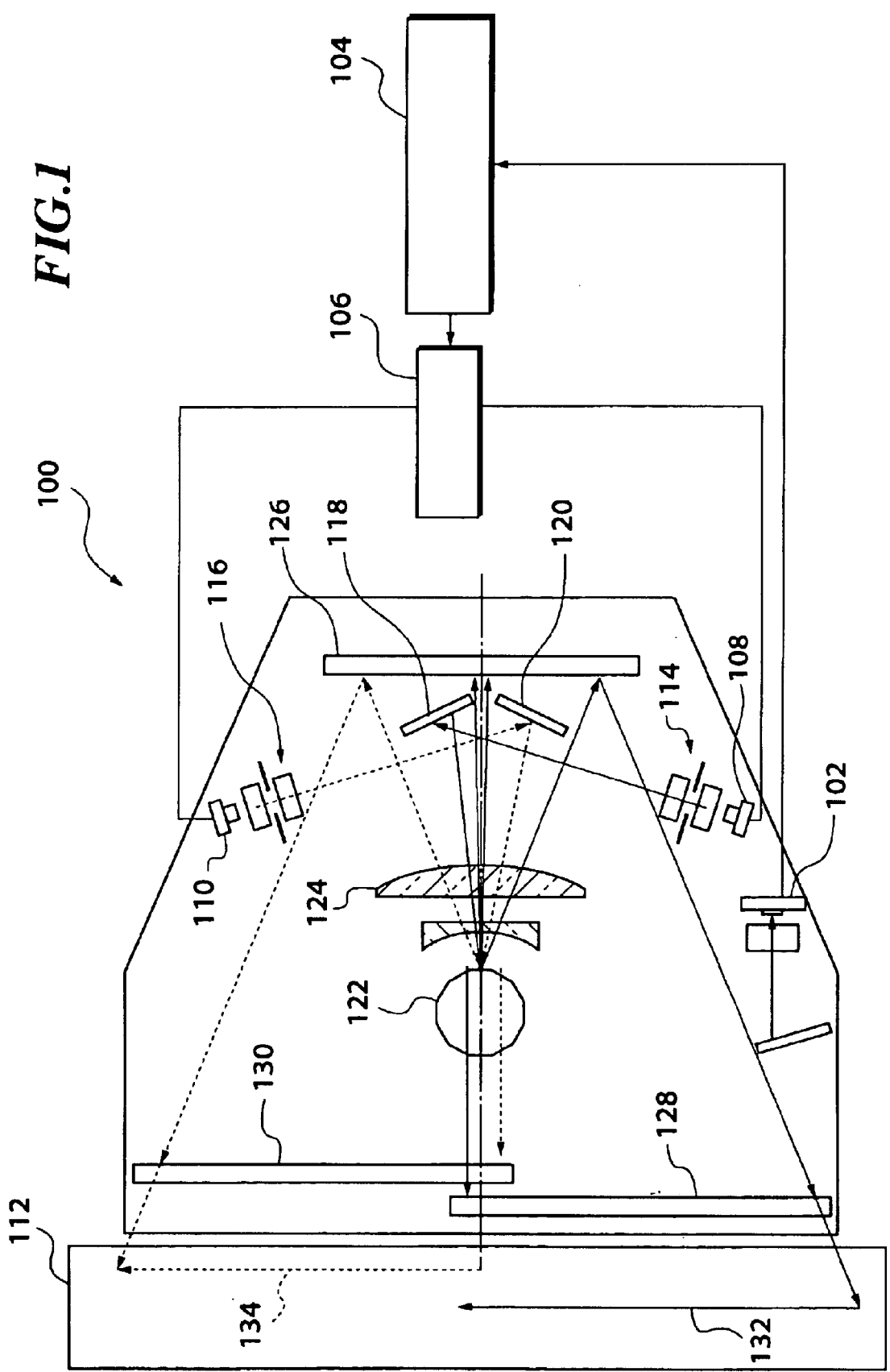
FIG. 1 is a schematic diagram showing a split scanning optical apparatus according to the first embodiment of the present invention.

FIG. 1 is a schematic diagram showing a split scanning optical apparatus 100 according to a first embodiment of the present invention.

The split scanning optical apparatus 100 is used as an optical apparatus of a laser printer. A light receiving element 102 is disposed within the split scanning optical apparatus 100.

A horizontal synchronizing signal is outputted from the light receiving element 102. Based on the horizontal synchronizing signal, an image information signal is outputted from a control unit 104 of the laser printer to a splitting part 106. Light sources 108 and 110 are modulated based on the image information signal, and a modulated light beam is guided to a photosensitive material 112 so that the photosensitive material 112 is exposed to light.

The light sources 108 and 110 are laser diodes (LD) and light from the light sources 108 and 110 is shaped by optical systems 114 and 116 and is inputted by mirrors 118 and 120 to a reflecting mirror surface of a polygon mirror 122.

The polygon mirror 122 rotates fast with constant angular speed, and light reflected on the reflecting mirror of the polygon mirror 122 is subjected to f-θ compensation in an optical system 124 having a function of f-θ lens. Light passing through the optical system 124 is further reflected by a mirror 126 and guided to the photosensitive material 112 by mirrors 128 and 130.

Split scanning lines 132 and 134 on the photosensitive material 112 go out of position in the sub scanning direction. This is a positional deviation of split scanning lines after adjustments of the optical apparatus. It is difficult to completely eliminate the positional deviation, and a positional deviation of about tens to hundreds of micrometers occurs in mechanical adjustments.

Image information signals successively outputted from the control unit 104 of the laser printer in accordance with horizontal synchronizing signals are converted into split image information in accordance with split scanning in the splitting circuit 106 and outputted to the split scanning optical apparatus 100.

Figure 2:
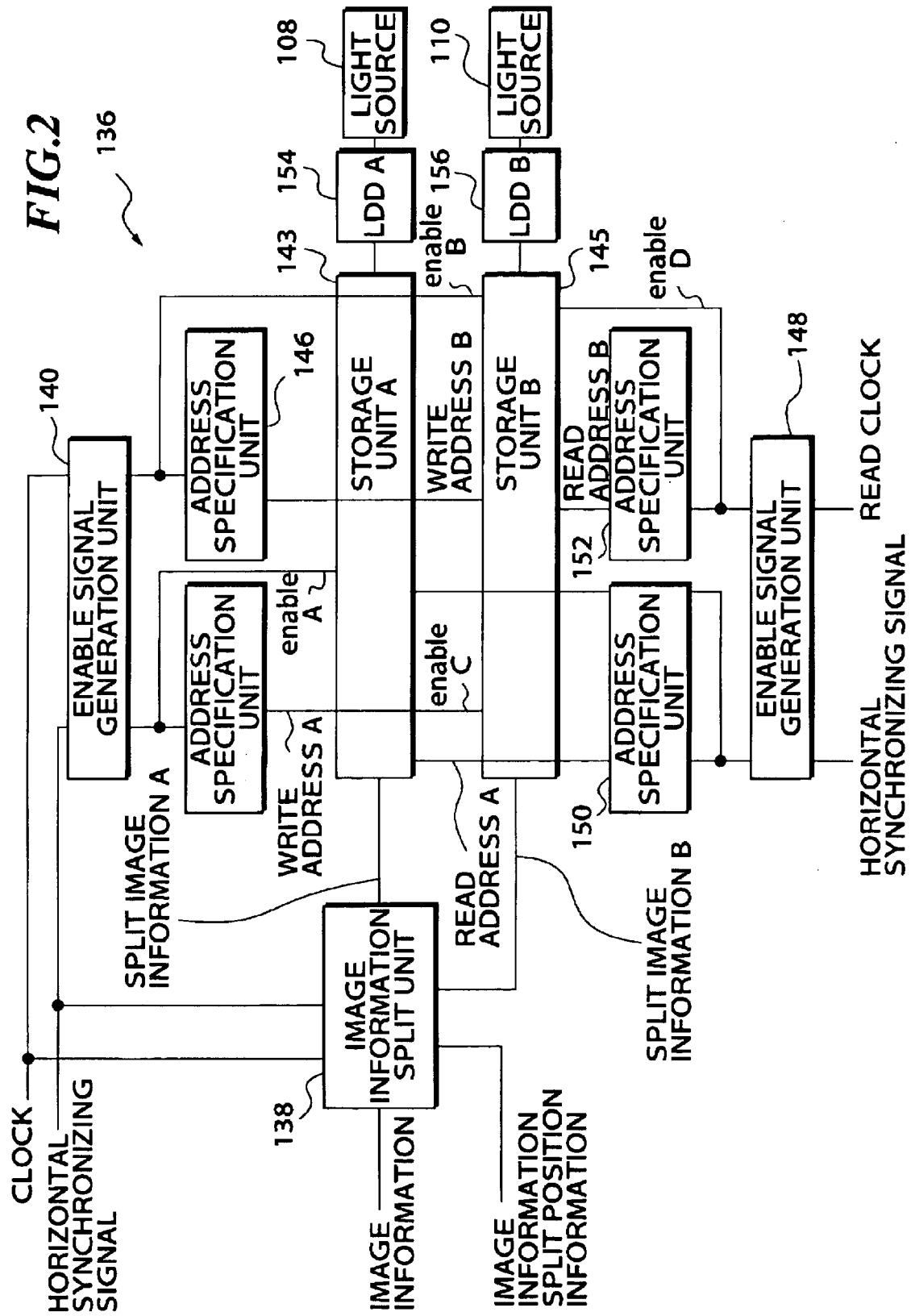
FIG. 2 is a block diagram showing a light source driving circuit used in the split scanning optical apparatus according to the first embodiment of the present invention.

FIG. 2 shows a driving circuit 136 that constitutes part of the splitting circuit 106 and turns on the light sources 108 and 110.

(Data Write System)

A clock signal and a horizontal synchronizing signal, as input signals, are inputted to an image information split unit 138 and an enable signal generation unit 140. Image information and image information split position information are inputted to the image information split unit 138, which has a function of an image information disabling part according to claim 3 of the present invention.

The image information is split by the image formation split unit 138 into split image information A and split image information B, which are stored in storage units A and B, respectively.

Address specification units 144 and 146 are connected to the enable signal generation part 140. From the enable signal generation unit 140, an enable signal A is outputted to the address specification unit 144 and the storage unit A 143. From the address specification unit 144, a write address A is outputted to the storage unit A 143.

From the enable signal generation unit 140, an enable signal B is outputted to the address specification unit 146 and the storage unit B 145. From the address specification unit 146, a write address B is outputted to the storage unit B 145.

A portion in which storage timing overlaps is provided between the enable signals A and B. In the overlapping portion, basically image information can be stored in both the storage units A 143 and B 145.

Figure 4:
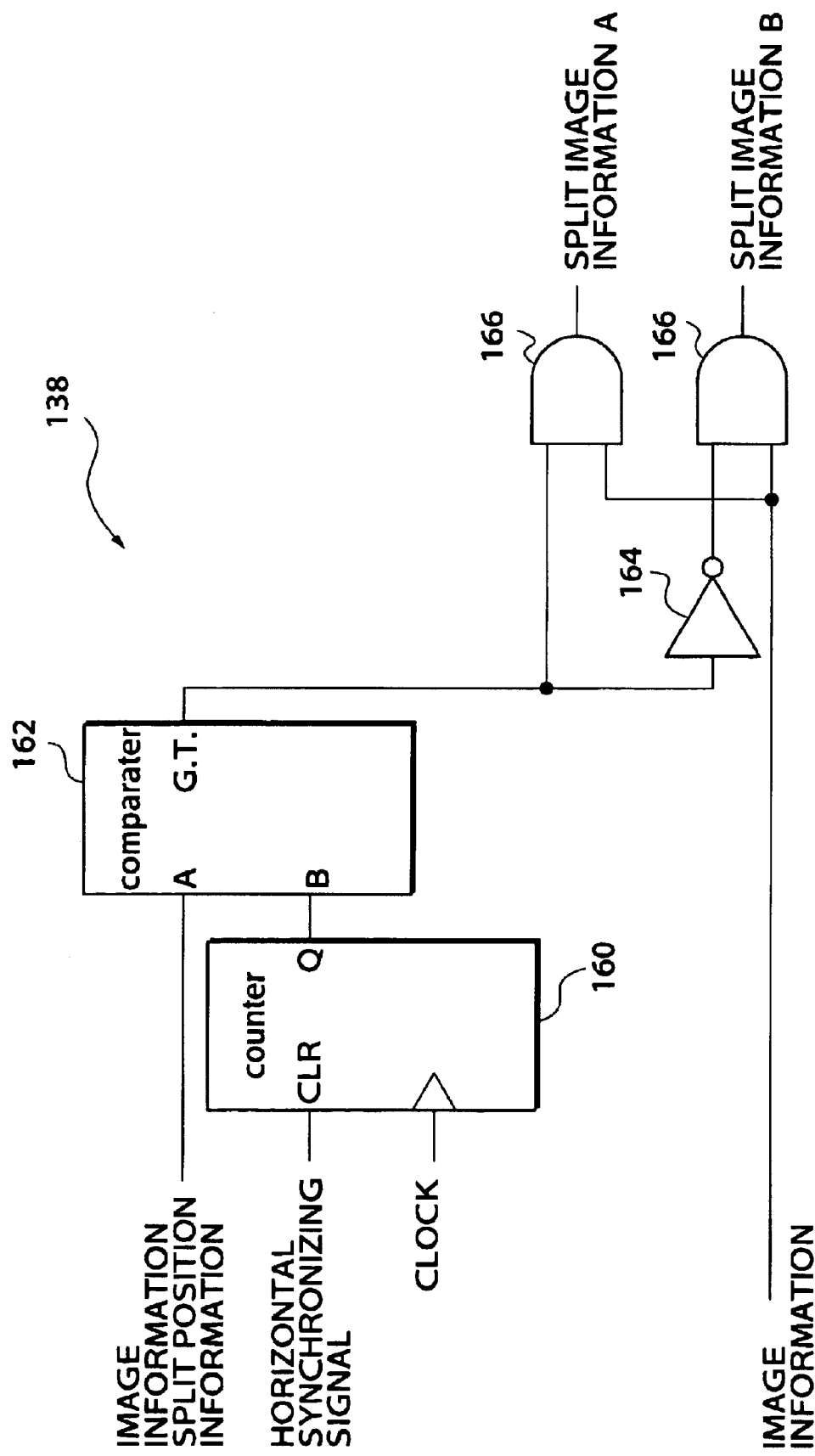
FIG. 4 is a detailed configuration diagram for an image information split part to output a dummy signal.

FIG. 4 shows a detailed configuration of the image information split unit 138.

A horizontal synchronizing signal and a clock signal are inputted to a counter 160, which sends a count value in accordance with the range of one main scanning to a comparator 162. The comparator 162 has a count value inputted based on preset image information split position information, and inverts comparator output when a predetermined count value is reached.

One of outputs of the comparator 162 is directly and the other is, after being inverted by an inversion circuit 164, inputted to one input end of AND circuits 166.

The AND circuits 166 are connected to the respective input ends of the storage units A 143 and B 145. Image information is inputted to the respective other input ends of the AND circuits 166.

As a result, as the output of the AND circuits 166, in a side (that is, a low-level (0) output side of the AND circuits 166) in which no image information is actually outputted, a dummy signal is outputted as an off signal for the light source 108 (or 110).

(Data Read System)

As shown in FIG. 2, a read clock signal and a horizontal synchronizing signal are inputted to an enable signal generation unit 148. The enable signal generation unit 148 is connected to an address specification unit 150 for specifying a read address for the split image information A stored in the storage unit A 143 and an address specification unit 152 for specifying a read address for the split image information B stored in the storage unit B 145. From the enable signal generation unit 148, an enable signal C is outputted to the address specification unit 150 and the storage unit A 143, and an enable signal D is outputted to the address specification unit 152 and the storage unit B 145.

The enable signals C and D, which are outputted based on the time for adjusting a deviation in the main scanning direction after mechanical adjustments of the optical systems, are outputted after adjustments for each main scanning line to match the position of the main scanning direction in one main scanning line.

In the address specification units 150 and 152, regardless of modification of a split position and the extent of the modification, only column addresses may be considered because a deviation in the sub scanning direction is compensated in advance by incrementing or decrementing row addresses by a simple sub scanning direction position control system not shown. The storage units A 143 and B 145 have only to have a storage capacity to store a deviation in the sub scanning direction (in the prior arts, a deviation after mechanical adjustments, corresponding to several lines).

Figure 5:
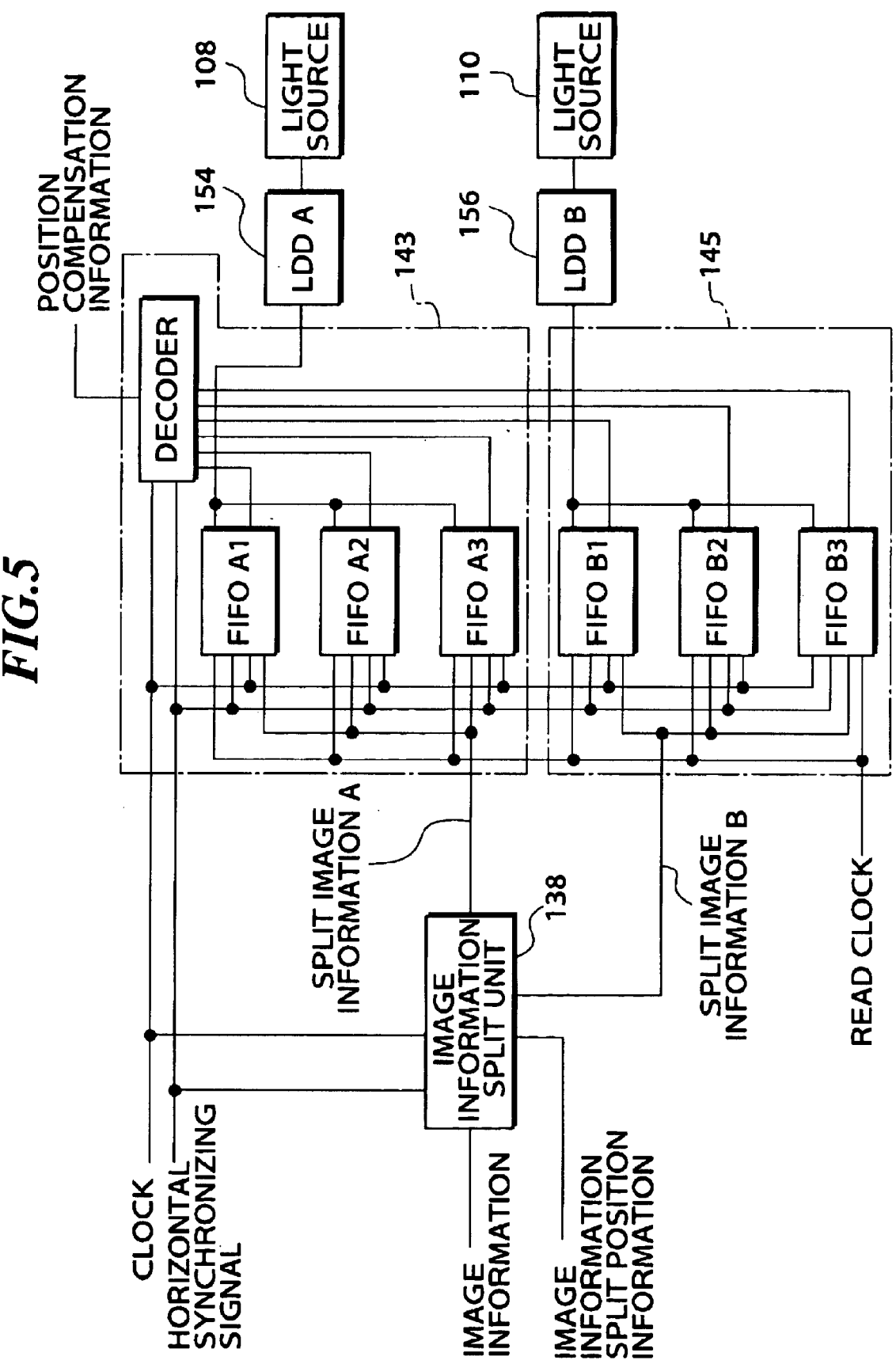
FIG. 5 is a block diagram showing application of a line memory to a storage unit.

FIG. 5 shows an example of storage units A 143 and B 145 each having a storage capacity of three lines. In FIG. 5, FIFO (A1, A2, A3) is the storage unit A 143 to store the three lines on a line basis and FIFO (B1, B2, B3) is the storage unit B 145 to store the three lines on a one-line basis.

(Output System)

The storage unit A 143 is connected to an LDD (laser diode driver) 154 for turning on the light source 108. Based on a signal from the address specification unit 150 and the enable signal C, a signal is outputted to the LDD 154, which turns on the light source 108 at a proper timing.

On the other hand, the storage unit B 145 is connected to an LDD (laser diode driver) 156 for turning on the light source 110. Based on a signal from the address specification unit 152 and the enable signal C, a signal is outputted to the LDD 156, which turns on the light source 110 at a proper timing.

Figure 3:
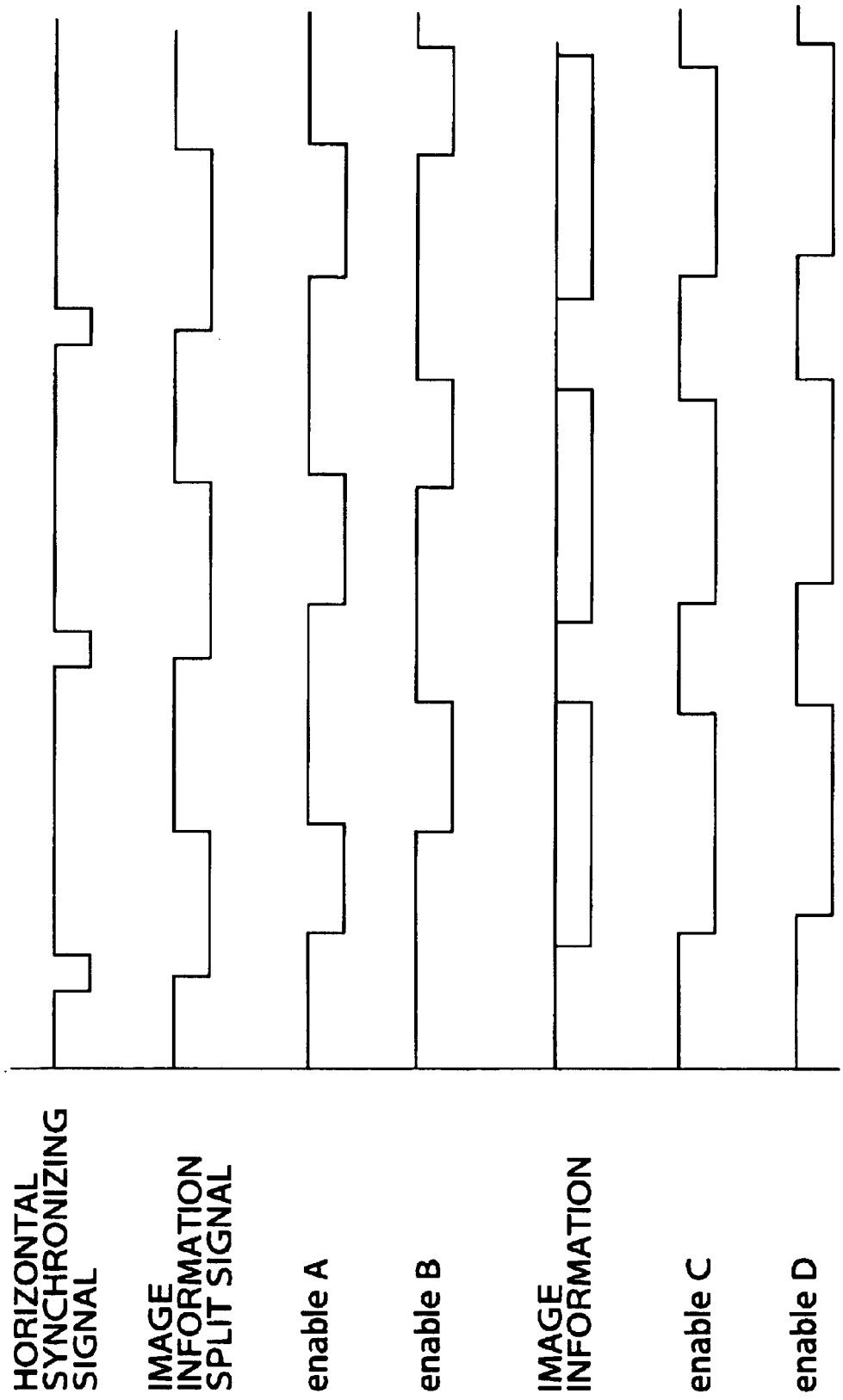
FIG. 3 is a time chart for the light source driving circuit of the split scanning optical apparatus according to the first embodiment of the present invention.

The operation of a first embodiment of the present invention will be described according to the time chart of FIG. 3.

The image information is split and stored in the storage units A 143 and B 145, based on a split position by the image information split position information. In this case, in the first embodiment, the information is stored in the addresses of the storage units A 143 and B 145 specified in the address specification units 144 and 146. Therefore, even when no output is made from the AND circuits 166, information indicating no output, that is, a dummy signal for turning off the light sources 108 and 110 will be stored.

Thereby, although light beams emitted from the two light sources 108 and 110 are overlapped-scanned without being completely separated, since either of them is always a dummy signal, no influence is exerted on the image.

The storage unit A 143 starts to store the split image information A upon input of the enable signal A. The dummy signal is stored between the time when the split image information A has been stored in the storage unit A 143 and the time when the enable signal A goes off.

On the other hand, the storage unit B 145 starts to store the split image information B, based on the enable signal B and the image information split signal. To be more specific, the dummy signal is stored after the enable signal B is outputted until the image information split signal is switched, with the result that the dummy signal is stored in the storage unit B 145 after the start of storage to the storage unit A 143 until the start of storage of the split image information B to the storage unit B 145.

In this way, in an overlap area, a dummy signal is stored in a storage unit (B145 or A143) other than a storage unit (A143 or B145) to actually store image information. Therefore, no previous information is left, and unnecessary image information is not stored, so that the image information never fails to be continuous at a split position without being too extra or lacking.

When the image information is split and stored in the storage units A 143 and B 145, the enable signal generation unit 148 of the read system outputs an enable signal C to the address specification unit 250 and the storage unit A 143, based on a horizontal synchronizing signal and a clock signal.

At almost the same time as this, the enable generation unit 148 outputs an enable signal D to the address specification unit 152 and the storage unit B.

Since the address specification units 150 and 152 increment or decrement row addresses based on a deviation in the sub scanning direction, the deviation in the sub scanning direction is solved regardless of the concurrent output of the enable signals.

In this way, in the first embodiment, by inserting a dummy signal in an overlap area, column addresses are adjusted, and even if a split position is modified on a one-line basis, control can be performed by the amount of dummy signals to be inserted so that a split always takes place at a predetermined position, so that the control system can be simplified. Also, deviation adjustment in the sub scanning direction is simplified, so that a feedback circuit and the like become unnecessary.

Next, a variant of the image split unit 138 is shown. The same components as those of FIG. 2 are assigned the same reference numerals and are not described.

Figure 6:
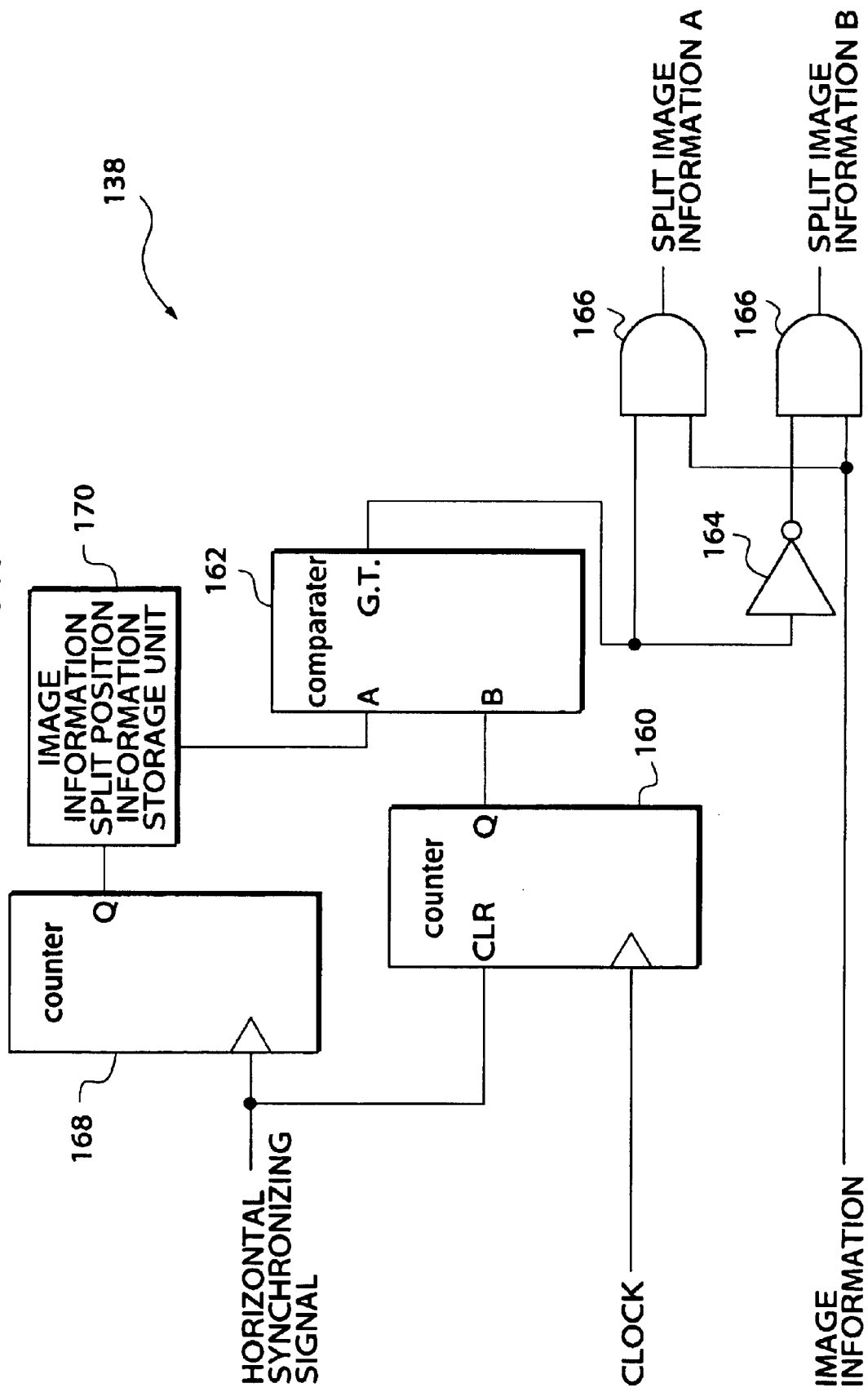
FIG. 6 is a detailed configuration diagram for the image information split unit capable of changing an image information split position for every scanning.

In FIG. 6, the image information split unit 138 is shown which can change the split timing of image information at an arbitrary timing for each scanning.

Specifically, in accordance with the output of the counter 168 for counting horizontal synchronizing signals, an image information split position information storage unit 170 outputs image information split position information stored in advance to the comparator 162.

The comparator 162 compares the output of the counter 160 for counting clock signals after input of a horizontal synchronizing signal with the output of the image information split position information storage unit 170 and outputs the comparison result.

The output of the comparator 162 and the image information are subjected to a logical operation (AND circuits 166) so that split image information A and split image information B are generated.

Although the image information split position information is stored in advance in the image information split position information storage unit 170, an image information split position may also be obtained by calculations in accordance with the image information.

Figure 7:
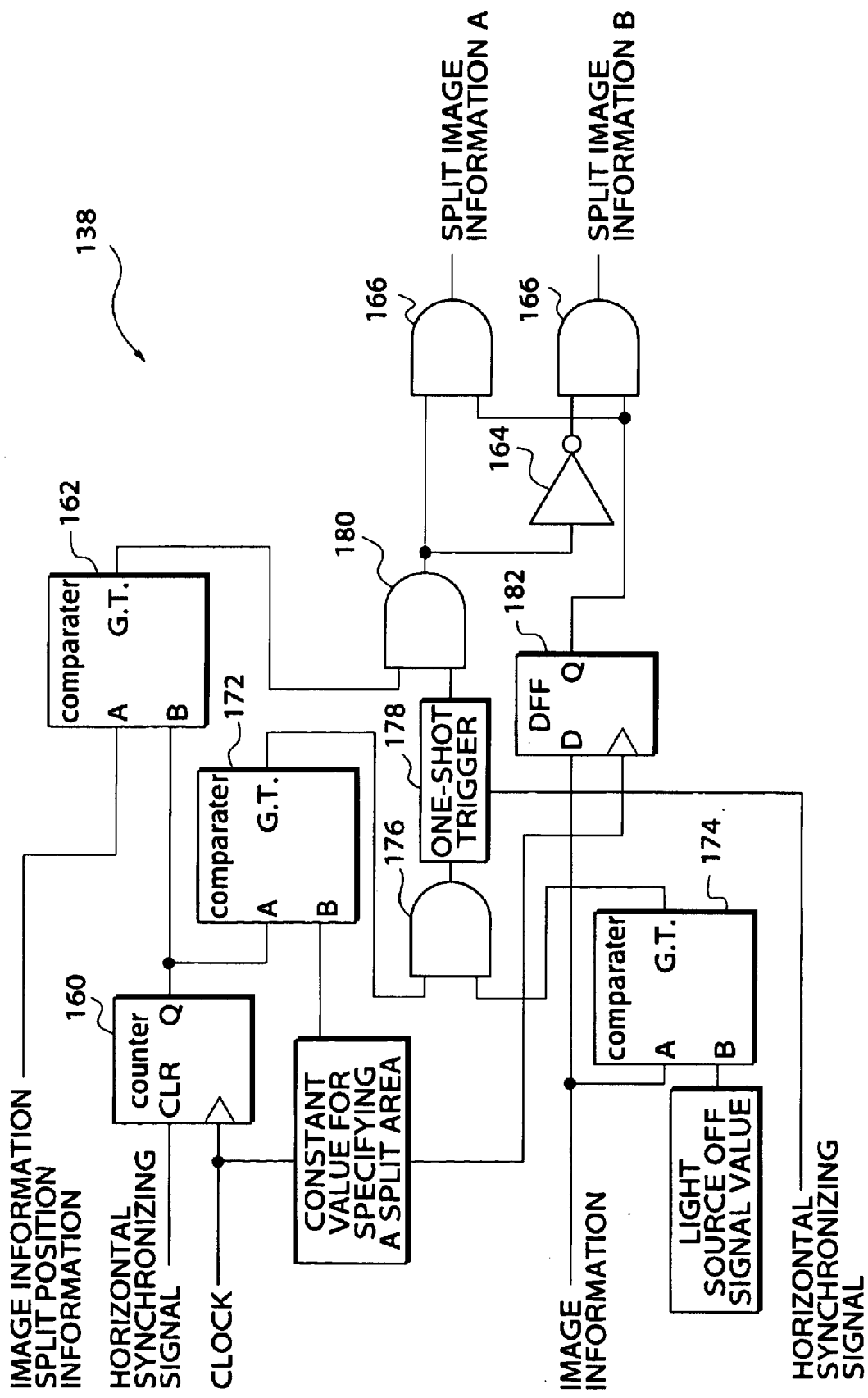
FIG. 7 is a detailed configuration diagram for the image information split unit capable of splitting image information by a light source off signal.

FIG. 7 shows a configuration for searching image information for a light source off signal and making a split at the position of the light source off signal.

As shown in FIG. 7, the counted value of the counter 160 for counting clock signals after a horizontal synchronizing signal, as well as a logical product (AND circuit 176) of the output of the comparator 172 indicating the start of an overlap area in which image information can be split, by comparing the counted value of the counter 160 with a constant value for specifying a split area, and the output of the comparator 174 to detect a light source off signal in the image information are inputted to a one-shot trigger 178 reset for each horizontal synchronizing signal.

The one-shot trigger 178 changes an output value in response to image information corresponding to the first light source off signal inputted in image information in an overlap area.

By calculating a logical product (AND circuit 180) of the output of the one-shot trigger 178 and the output of the comparator 162 to output an image information split position, an image information split position is determined by one of the two outputs, whichever was outputted earlier. The image information is inputted to the AND circuits 166 via a D flip-flop circuit 182 so that it is synchronized with a signal from the AND circuit 180.

Second Embodiment

Hereinafter, a second embodiment of the present invention will be described. The second embodiment, which can be constructionally a simplified version of the first embodiment, is effective for images for which the number of modifications of split positions will be small.

Figure 8:
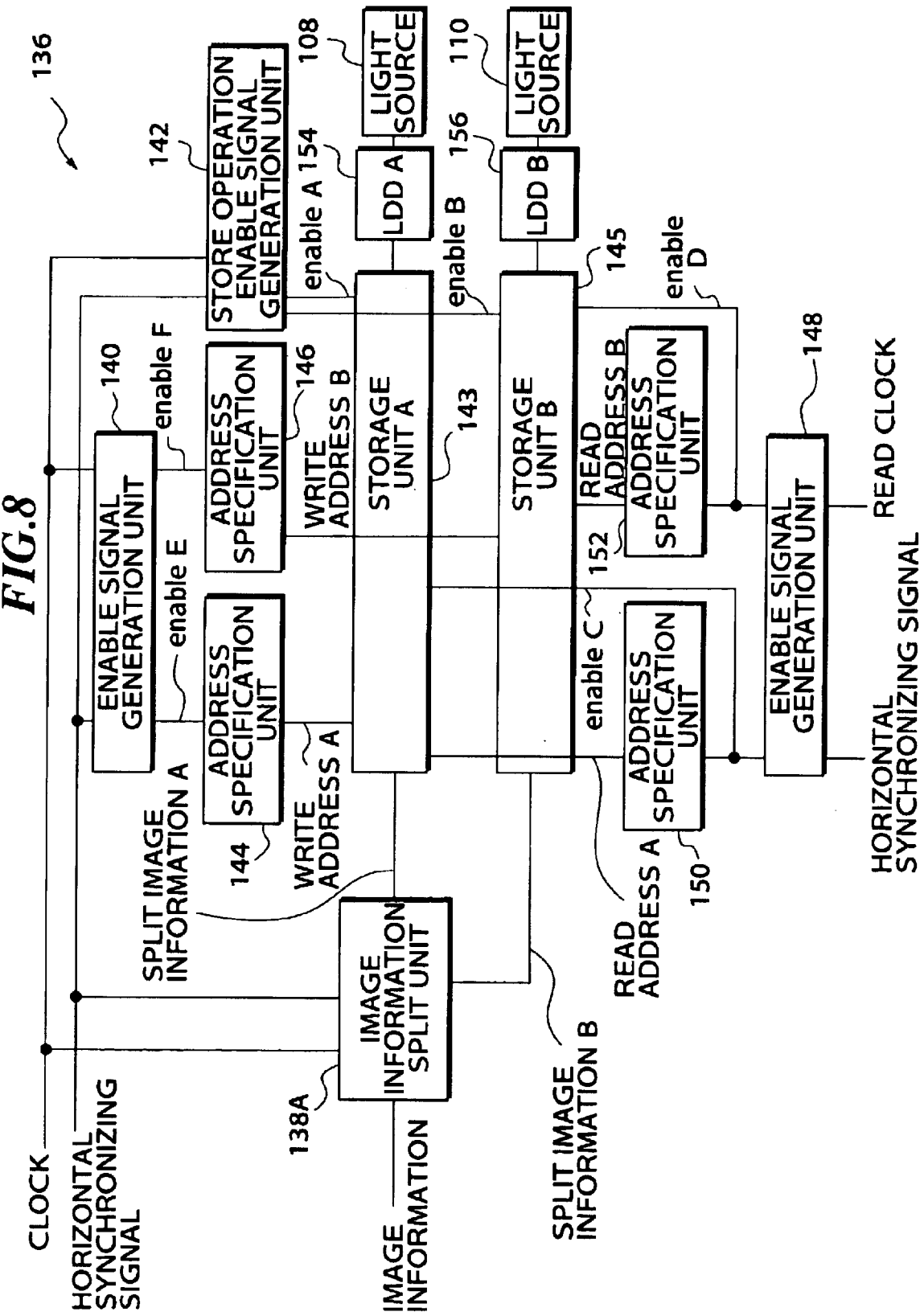
FIG. 8 is a block diagram for the light source driving circuit used in the split scanning optical apparatus according to a second embodiment of the present invention.

FIG. 8 shows a driving circuit 136 that constitutes part of the splitting circuit 106 and turns on the light sources 108 and 110.

(Data Write System)

A clock signal and a horizontal synchronizing signal, which are input signals, are inputted to the image information split unit 138A, the enable signal generation unit 140, and a storage operation enable signal generation unit 142 as a storage operation switching part set forth in claim 4. Image information is also inputted to the image information split unit 138A, by which the image information is split into split image information A and split image information B, which are stored in the storage units A and B, respectively.

From the enable signal generation unit 140, an enable signal E is outputted to the address specification unit 144 for specifying a write address to the storage unit A 143 and an enable signal F is outputted to the address specification unit 146 for specifying a write address to the storage unit B 145. The address specification units 144 and 146 specify addresses for writing image information to the storage units A 143 and B 145, respectively. An overlapping portion is provided between the enable signals E and F. In the overlapping portion, basically image information can be stored in both the storage units A 143 and B 145.

From the storage operation enable signal generation unit 142, an enable signal A is outputted to the storage unit A 143 and an enable signal B is outputted to the storage unit B 145.

The timing of switching between the enable signals A and B from the storage operation enable signal generation unit 142 provides a substantial split position of image information.

Therefore, for example, in the storage unit A 143, no image information is recorded in an address to which an enable signal A is not inputted, which is equivalent to the state of an off signal for the light source 108. When a split position is changed for every main scanning operation (or for every certain plural number of main scanning operations), previous image information may remain in an address in which no image information is newly recorded. Therefore, it is necessary that the storage unit A 143 positively replaces an address to which the enable signal A is not inputted, by an off signal for the light source 108, while the storage unit B 145 positively replaces an address to which the enable signal B is not inputted, by an off signal for the light source 110.

(Data Read System)

A read clock signal and a horizontal synchronizing signal are inputted to the enable signal generation unit 148. The enable signal generation unit 148 is connected to the address specification unit 150 for specifying a read address for the split image information A stored in the storage unit A 143 and an address specification unit 152 for specifying a read address for the split image information B stored in the storage unit B 145. From the enable signal generation unit 148, an enable signal C is outputted to the address specification unit 150 and the storage unit A 143, and an enable signal B is outputted to the address specification unit 152 and the storage unit B 145.

The enable signals C and D, which are outputted based on the time for adjusting a deviation in the main scanning direction after mechanical adjustments of the optical systems, are outputted after adjustments for each main scanning line to obtain alignment in the main scanning direction.

The address specification units 150 and 152 compensates a deviation in the sub scanning direction by incrementing or decrementing column addresses. In this case, information about a deviation in the sub scanning direction is inputted from a circuit not shown. Accordingly, the storage units A and B have only to have a storage capacity to store a deviation in the sub scanning direction (in the prior arts, a deviation after mechanical adjustments, corresponding to several lines).

(Output System)

The storage unit A is connected to an LDD (laser diode driver) 154 for turning on the light source 108. Based on a signal from the address specification unit 150 and the enable signal C, a signal is outputted to the LDD 154, which turns on the light source 108 at a proper timing.

On the other hand, the storage unit B 145 is connected to an LDD (laser diode driver) 156 for turning on the light source 110. Based on a signal from the address specification part 152 and the enable signal C, a signal is outputted to the LDD 156, which turns on the light source 110 at a proper timing.

Figure 9:
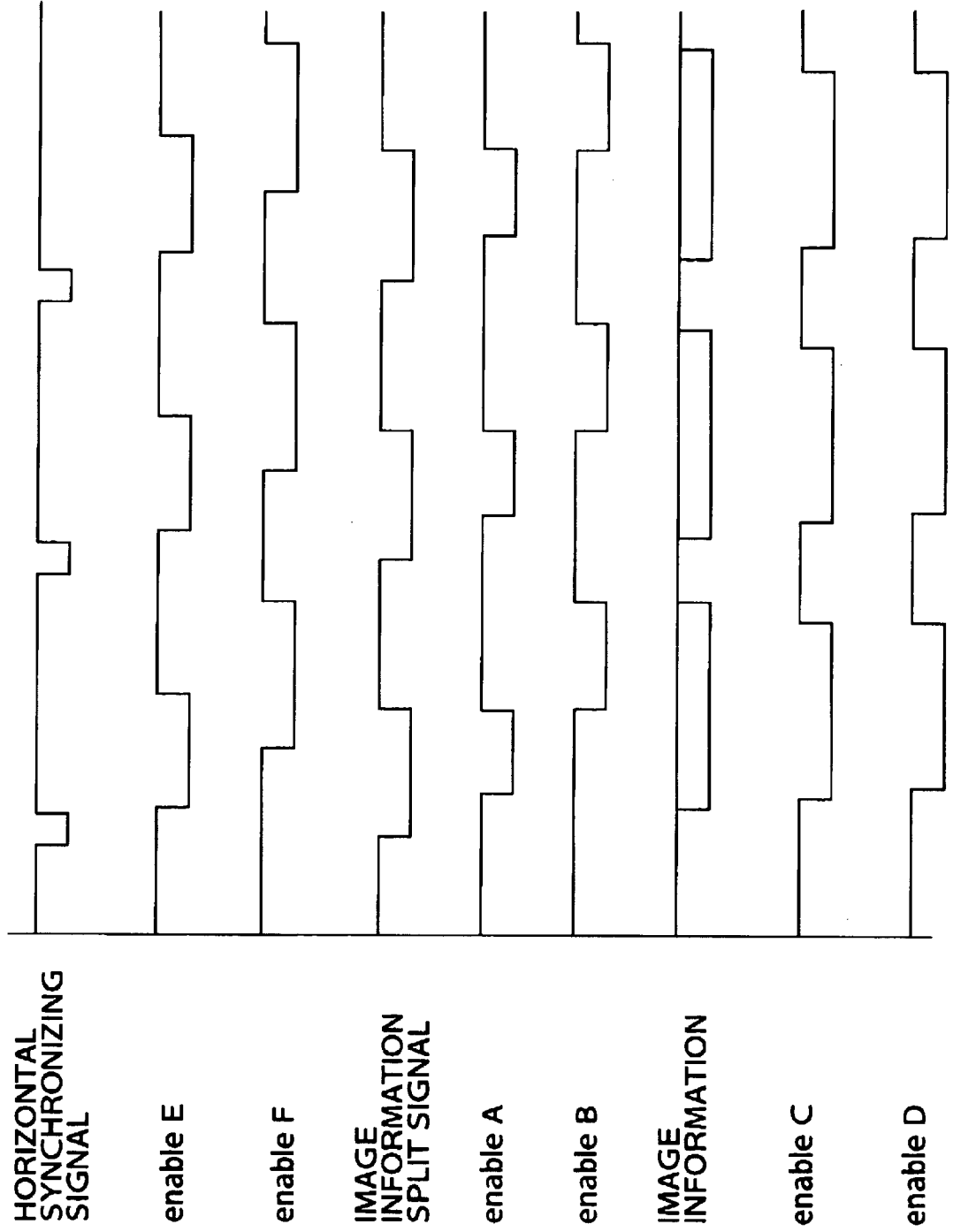
FIG. 9 is a time chart for the light source driving circuit of the split scanning optical apparatus according to a second embodiment of the present invention.
Figure 10A:
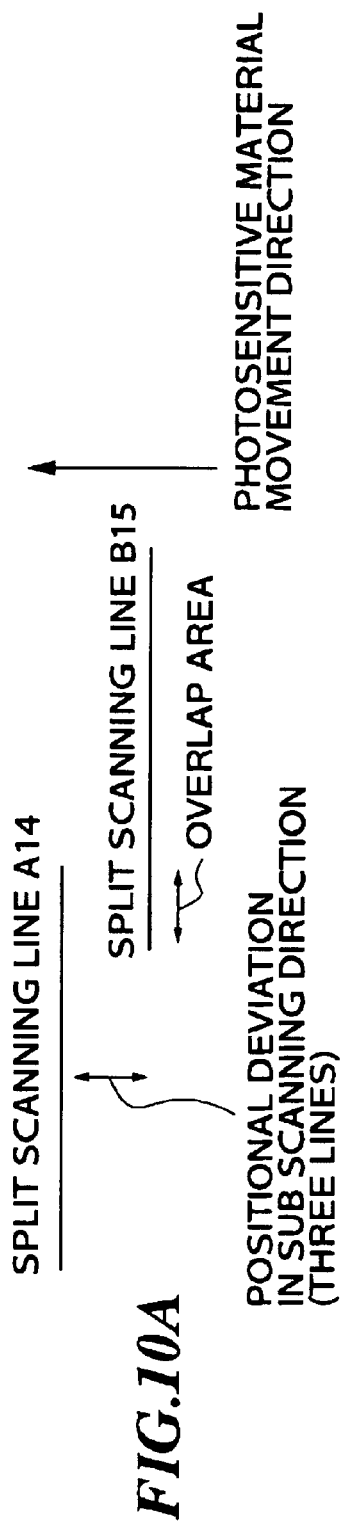
FIG. 10 is a time chart showing a relationship between a positional deviation of split scanning lines and image write timing.
Figure 10B:
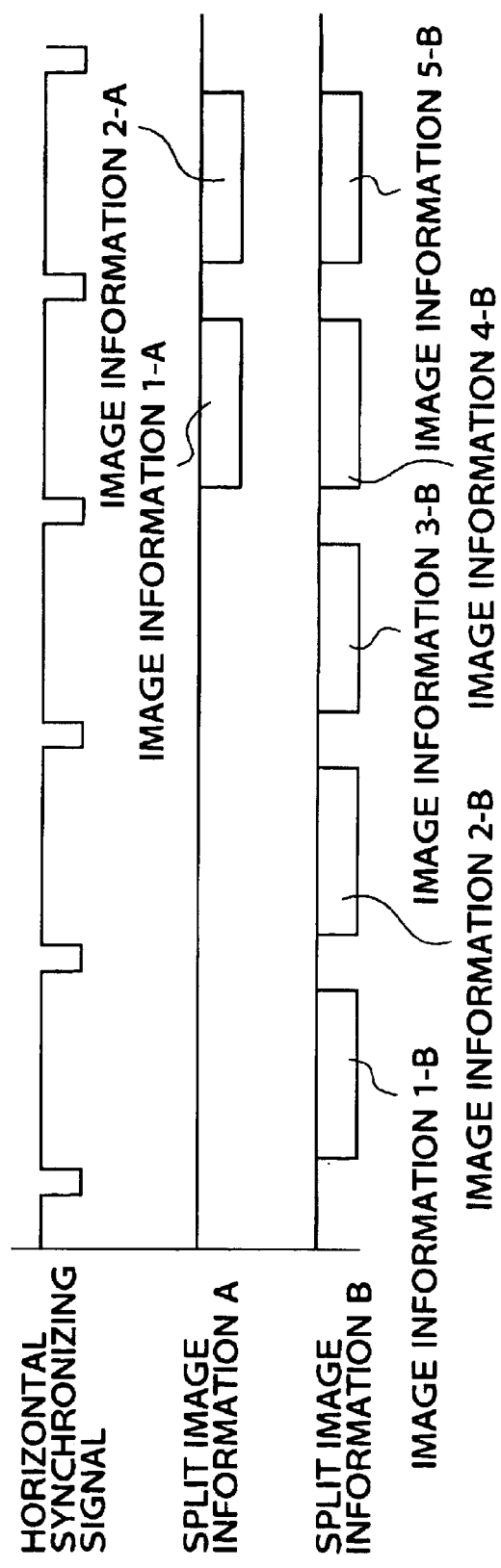

The operation of a second embodiment of the present invention will be described according to the time chart of FIG. 9.

Image information is inputted to the image information split unit 138A, which splits the image information into split image information A and split image information B. At this time, based on a horizontal synchronizing signal and a clock signal appended to the image information, the image information is split at a proper position during one main scanning. The split position may be fixed, but generally, to make a split position inconspicuous, it is preferable to change a split position for every main scanning operation or for every certain plural number of main scanning operations.

The split image information A and the split image information B are stored in the storage units A 143 and B 145, respectively, at a timing controlled by the enable signal generation unit 140 and a store operation enable signal generation unit 142.

To be more specific, addresses for writing to the storage units A and B are determined by enable signals E and F outputted from the enable signal generation unit 140. The write addresses have a mutually overlapping area and do not determine a specific split position. A split position may be determined arbitrarily so long as it is within the overlapping area.

Upon input of an image information split signal, the store operation enable signal generation unit 142 outputs an enable signal A or B alternately to the storage units A 143 and B 145. This embodiment assumes that the enable signal A is outputted earlier and the enable signal B is outputted at almost the same time as termination of output of the enable signal A.

The storage unit A 143 starts to store the split image information A upon input of the enable signal A. In this case, nothing is stored throughout an interval after a write address is specified from the address specification unit 144 until an enable signal A is inputted, which is equivalent to an off signal for the light source 108. However, if a current split position is changed with respect to a previous split position, the previous image information may remain. Therefore, the contents of addresses corresponding to the above interval must be replaced with off signals for the light source 108.

At almost the same time as termination of storage of the split image information A to the storage unit A 143, the storage unit B starts to store the split image information B upon input of the enable signal B. In this case, nothing is stored throughout an interval after a write address is specified from the address specification unit 146 until the enable signal B is inputted, which is equivalent to an off signal for the light source 110. However, if a current split position is changed with respect to a previous split position, the previous image information may remain. Therefore, the contents of addresses corresponding to the above interval must be replaced with off signals for the light source 110.

The above replacement to off signals is not indispensable to the second embodiment of the present invention because it is not required if a split position is formed in a left-downward, slanting direction from the top to the bottom row (a split position is gradually accelerated).

After the image information is split and stored in the storage units A 143 and B 145, the enable signal generation unit 148 of the read system outputs an enable signal C to the address specification unit 250 and the storage unit A 143 based on a horizontal synchronizing signal and clock signal.

At almost the same time, the enable signal generation unit 148 outputs an enable signal D to the address specification unit 152 and the storage unit B.

Since the address specification units 150 and 152 increment or decrement row addresses based on a deviation in the sub scanning direction, the deviation in the sub scanning direction is solved regardless of the concurrent output of the enable signals.

On the other hand, for positions in the main scanning direction, a write timing is determined during writing by an area equivalent to a light source off signal. Accordingly, the write timing may be synchronized with the output of the enable signals A and B.

In this way, according to the second embodiment of the present invention, in the case where the addresses in which split image information pieces A and B are stored in the storage units A 143 and B 145 are determined by the address specification units 144 and 146, an area overlapping between both the addresses is allocated in advance, and a write timing, that is, a split position, is set by the enable signals A and B from the store operation enable signal generation unit 142. Accordingly, an area, specified by the address specification unit 144, to which the enable signal A is not outputted basically corresponds to an off signal for the light source 108. An area, specified by the address specification unit 146, to which the enable signal B is not outputted basically corresponds to an off signal for the light source 110. Accordingly, since the output of the off signal exerts no influence on counterparts, it is unnecessary to change a write address each time a split position is modified, so that circuit configuration is simplified.

As has been described above, a split image scanning optical apparatus according to the present invention has an excellent effect of being capable of performing correction of a positional deviation of split scanning lines in the sub scanning direction and modification of an image information split position with a simple circuit configuration.

What is claimed is:

1. A split scanning optical apparatus that includes a plurality of split scanning units for performing scanning within split areas split in a main scanning area and performs exposure for one-time main scanning by performing scanning at the same time by the plurality of split scanning units, the split scanning optical apparatus comprising:

an image information split part that is provided with overlap areas in scanning areas of the split scanning units, an identical portion on a surface to be scanned being exposable mutually in the overlap areas, and splits image information to be provided by exposure to a surface to be scanned into split image information to be provided respectively by the split scanning units;

a plurality of storage parts that respectively store the split image information;

a plurality of address specification parts that respectively specify storage addresses to the storage parts; and a store operation control part that controls a store operation of the storage parts so that a split position of the image information falls in an overlapping range of the plurality of storage parts specified by the address specification parts, wherein the store operation control part is a store operation switching part that, when two of said address specification parts are busy, cancels a store operation on split image information A to a storage part thereof and switches to a store operation on split image information B to a storage part thereof, wherein the two pieces A and B of split image information each contain identical image information in the overlap area and one of the address specification parts controls a store operation on the split image information A to the storage part thereof and the other controls a store operation on the split image information B to the storage part thereof.

2. The split scanning optical apparatus according to claim 1, wherein the store operation control part is an image information disabling part that outputs a dummy signal as a light source off signal to addresses within the range of the overlap area specified by the address specification parts in storage parts other than storage parts that store image information.

3. The split scanning optical apparatus according to claim 2, wherein if image information corresponding to the dummy signal is detected before the information split takes place, an image split store operation by the image information disabling part is performed upon detecting of the image information corresponding to the dummy signal.

4. The split scanning optical apparatus according to claim 1, further comprising a timing change part that changes split timing by the store operation control part for every main scanning operation or for every certain plural number of main scanning operations.

* * * * *